US011913425B2

(12) United States Patent
Kenney

(10) Patent No.: US 11,913,425 B2
(45) Date of Patent: Feb. 27, 2024

(54) ENERGY CONVERSION SYSTEM

(71) Applicant: Alan David Kenney, Wrexham (GB)

(72) Inventor: Alan David Kenney, Wrexham (GB)

(73) Assignee: Alan David Kenney, Wrexham (GB)

( * ) Notice: Subject to any disclaimer, the term of this patent is extended or adjusted under 35 U.S.C. 154(b) by 205 days.

(21) Appl. No.: 17/594,946

(22) PCT Filed: May 9, 2019

(86) PCT No.: PCT/GB2019/051281
§ 371 (c)(1),
(2) Date: Nov. 3, 2021

(87) PCT Pub. No.: WO2020/225517
PCT Pub. Date: Nov. 12, 2020

(65) Prior Publication Data

US 2022/0299005 A1 Sep. 22, 2022

(51) Int. Cl.
*F03B 17/00* (2006.01)

(52) U.S. Cl.
CPC ........ *F03B 17/005* (2013.01); *F05B 2210/13* (2013.01); *F05B 2220/20* (2013.01)

(58) Field of Classification Search
CPC ...................................................... F03B 17/005
See application file for complete search history.

(56) References Cited

U.S. PATENT DOCUMENTS

2003/0147305 A1 8/2003 Kenney

FOREIGN PATENT DOCUMENTS

WO 9109224 A1 6/1991
WO 9219864 A1 11/1992

OTHER PUBLICATIONS

PCT International Search Report and Written Opinion for International Application No. PCT/GB2019/051281, dated Jan. 14, 2020, 9 pages.

*Primary Examiner* — Sean Gugger
(74) *Attorney, Agent, or Firm* — Hoffman Warnick LLC

(57) ABSTRACT

An energy conversion system comprising: a riser conduit comprising a first liquid; a down-comer comprising a second liquid, the down-comer in fluid communication with the riser conduit, the second liquid comprising first liquid and finely divided material in suspension such that the second liquid has a higher specific gravity than the first liquid, the down-comer in fluid communication with a first tank and a second tank; a converter device arranged to convert energy of the first liquid into energy for output from the energy conversion system, and to discharge the first liquid thereafter; and a recirculator arranged to recirculate third liquid to maintain the finely divided material in suspension, the third liquid comprising second liquid and further finely divided material in suspension. The recirculator is arranged to discharge the third liquid to mix with the first liquid from the converter device to form the second liquid. The first tank and the second tank are arranged between the converter device and the down-comer, to receive the first liquid discharged from the converter and to supply the first liquid to the down-comer. Supply of first liquid to the first and second tanks is in use regulated to maintain the height of liquid in the first and second tanks below a predetermined threshold.

22 Claims, 10 Drawing Sheets

ENERGY CONVERSION SYSTEM

TECHNICAL FIELD

Example embodiments of the present invention relate to energy conversion systems, and to associated methods.

BACKGROUND ART

Some energy conversion systems comprise a finely divided material in suspension in a liquid. Changes in dilution of the finely divided material, and thus the specific gravity of the liquid, cause the liquid to move within the system under the action of gravity, enabling energy conversion processes to take place. However, during operation of such energy conversion systems it can be difficult to regulate the specific gravity of the liquid to stay within intended design parameters as the energy conversion system operates.

Example embodiments of the present invention aim to address at least one problem of the prior art, whether identified herein, or otherwise.

DISCLOSURE OF INVENTION

According to a first aspect of the invention, there is provided an energy conversion system comprising: a riser conduit comprising a first liquid; a down-comer comprising a second liquid, the down-comer in fluid communication with the riser conduit, the second liquid comprising first liquid and finely divided material in suspension such that the second liquid has a higher specific gravity than the first liquid, the down-comer in fluid communication with a first tank and a second tank; a converter device arranged to convert energy of the first liquid into energy for output from the energy conversion system, and to discharge the first liquid thereafter; and a recirculator arranged to recirculate third liquid to maintain the finely divided material in suspension, the third liquid comprising second liquid and further finely divided material in suspension so that the third liquid has a higher specific gravity than the second liquid. The recirculator is arranged to discharge the third liquid to mix with the first liquid from the converter device to form the second liquid; wherein the first tank and the second tank are arranged between the converter device and the down-comer, to receive the first liquid discharged from the converter and to supply the first liquid to the down-comer, and wherein supply of first liquid to the first and second tanks is in use regulated, in order to maintain the height of liquid in the first and second tanks below a predetermined threshold.

Such an energy conversion system is advantageous, as maintaining the height of liquid in each of the first and second tanks below a predetermined threshold helps to control the height of the first liquid in the riser conduit, thus maintaining the head of water available to drive the turbine.

In one example, the regulation of the supply of first liquid is by an alternating discharge arrangement that in use alternates the discharge between the first and second tanks. In one example, the alternating discharge arrangement comprises a diverter valve with a single inlet port and two outlet ports. In one example the alternating discharge arrangement comprises a diverter valve with a movable plate, arranged such that the movement of the plate alternately covers one of two outlet ports to thereby provide alternating discharge. In one example, the alternating discharge arrangement comprises at least one timer operated valve.

In one example, the energy conversion system further comprises a separator arranged to receive second liquid from the down-comer, separate the first liquid from the finely divided material, and discharge first liquid to the riser conduit and second liquid to the recirculator. In one example, the separator comprises a separation tank. In one example, the separation tank has an area which decreases with decreasing height, so that velocity of flow within the tank falls with increasing height in the separation tank to remove the finely divided material from suspension, and the separation tank further comprises an upper outlet arranged to discharge into the riser conduit. In one example, the separation tank comprises a conical body.

In one example, the separator further comprises a separation vessel, the separation vessel operable to receive fluid from the upper outlet, separate finely divided material from the fluid, and discharge first liquid to the riser conduit and return liquid to the separation tank via a downpipe. In one example, the finely divided material is magnetic, the separation vessel comprises a separation drum. In one example, the separation drum is rotatable so that finely divided material which is attracted to the separation drum is separated from the first liquid. In one example, the separation vessel further comprises a permanent magnet within the separation drum. In one example, the drum magnet extends over approximately 130 to 150 degrees of an arc of the drum, for example 140 degrees. In one example, the separation vessel comprises a wiper to remove the finely divided material from the separation drum and direct the finely divided material towards the return pipe. In one example, the separation vessel is a pressure vessel, and fluid level in the separation vessel is controllable by controlling admission and venting of air in the separation vessel. In one example, the recirculator comprises a recirculation column to receive third liquid from the separation tank and discharge the third liquid to mix with first liquid from the first fluid from the first tank and the second tank. In one example, the recirculation column is arranged to receive third liquid from a lower outlet of the separation tank.

In one example, the recirculator comprises a propeller pump. In one example, the propeller pump is lined with abrasion resistant material. In one example, the propeller pump comprises a shaft protected by an air-locked shroud. In one example, the recirculator comprises a hydraulic motor arranged in use to drive the propeller pump. In one example, recirculator comprises a fluid displacement force pump operable to recirculate the third liquid.

In one example, the converter device comprises a turbine and the work output comprises kinetic energy. In one example, the converter device comprises a hydraulic air compressor, the hydraulic air compressor arranged in use to receive and compress air, so that the work output is compression of the air.

According to a second aspect of the invention, there is provided a method of converting energy, comprising the steps of: providing a riser conduit comprising a first liquid; providing a down-comer comprising a second liquid, the down-comer in fluid communication with the riser conduit, the second liquid comprising first liquid and a finely divided material in suspension so that the second liquid has a higher specific gravity than the first liquid, the down-comer in fluid communication with a first tank and a second tank; converting potential energy of the first liquid into a work output and discharging the first liquid; recirculating third liquid to maintain the finely divided material in suspension, the third liquid comprising second liquid and further finely divided material in suspension so that the third liquid has a higher specific gravity than the second liquid, and discharging the third liquid to mix with the first liquid from the converter device to form the second liquid; receiving the first liquid and the third liquid in the first tank and the second tank; and regulating supply of the first liquid to the first tank and the second tank to maintain the height of liquid in each of the first and second tanks (16, 15) below a predetermined threshold.

According to the present invention there is provided an apparatus and method as set forth in the appended claims. Other features of the invention will be apparent from the dependent claims, and the description which follows.

BRIEF DESCRIPTION OF DRAWINGS

For a better understanding of the invention reference is made, by way of example only, to the accompanying drawings, in which.

MODES FOR CARRYING OUT THE INVENTION

Figure 1:
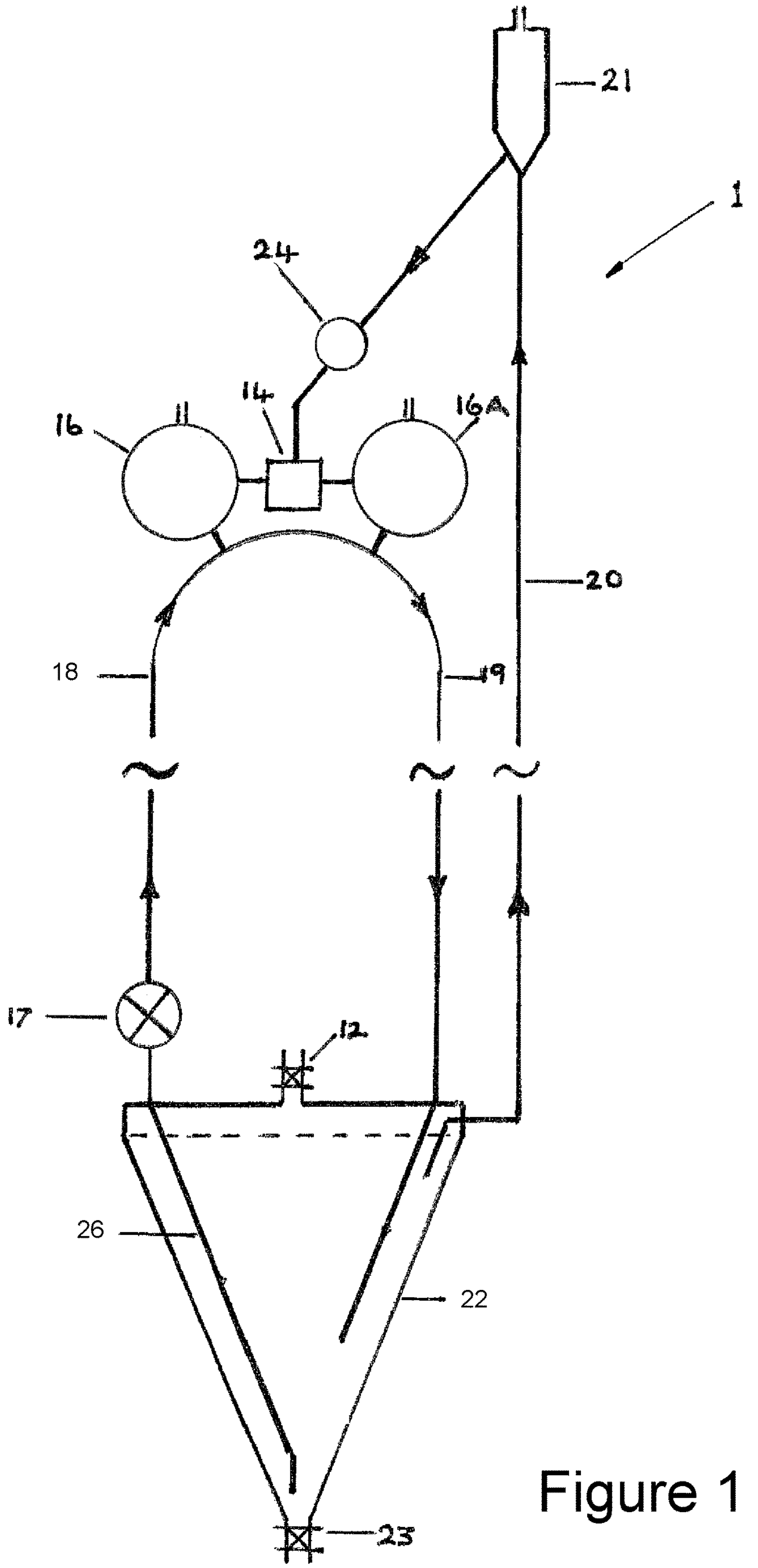
FIG. 1 is a schematic drawing of an energy conversion system, according to a first example embodiment.

Referring to FIG. 1, there is shown an example energy conversion system 1 according to a first example embodiment. The energy conversion system 1 comprises a riser conduit 20. The riser conduit 20 comprises a first liquid. The energy conversion system 1 further comprises a down-comer 19. The down-comer 19 comprises a second liquid. The second liquid comprises first liquid with a finely divided material in suspension so that the second liquid has a higher specific gravity than the first liquid. In this example the first liquid is water and the finely divided material is ferrosilicon. The finely divided material is suitably of a particle size such that 100% of the finely divided material will pass a 0.2 mm mesh. The down-comer 19 and the riser conduit 20 extend upwards to provide vertical separation between lower and upper portions thereof, whereby a pressure difference due to gravity is experienced in the fluid as between the lower and upper portions thereof.

The energy conversion system 1 comprises a first tank 16 and a second tank 16A. The first tank 16 and the second tank 16A are arranged in fluid communication with the down-comer 19 so that the contents of the first and second tanks 16, 16A may drain from the lower portions thereof and then into the down-comer 19. The down-comer 19 is in fluid communication with the riser conduit 20 via a separator that comprises a separation tank 22.

A turbine 24 is arranged to receive fluid flowing through the riser conduit 20. The turbine acts as a converter device to convert energy of the first liquid into energy for output from the energy conversion system 1. In the embodiment of FIG. 1, the turbine is located below a header tank 21 that is useful in priming the energy conversion system with the first liquid, ensuring the riser conduit 20 is sufficiently supplied with the first liquid during energy conversion operations, and opens the circulation path of the first liquid to atmospheric pressure.

The first liquid discharged from the turbine 24 is delivered to an alternating discharge arrangement 14 that is arranged to regulate flow from the turbine 24 to the first tank 16 and the second tank 16A. The importance of regulating the height of the first liquid in the first and second tanks is described further below.

The down-comer 19 discharges into the separation tank 22, for example at a level near the midpoint between the top and bottom of the separation tank 22. At an upper region of the separation tank an outlet from the separation tank 22 discharges to the riser conduit 20. The separation tank 22 has an area which decreases with decreasing height in a generally conical manner. The separation tank 22 comprises a regulator 12 by which pressurised fluid can be added to the upper portion thereof, for example compressed air, or a compressed inert gas such as nitrogen which will not lead to undesirable oxidation of contents of the separation tank 22. Indeed, instead of pressurised gas such as air or nitrogen, a liquid which is generally immiscible with the third liquid may be used. Pressurising the separation tank 22 in this way serves to aid in recirculation of a third liquid.

The energy conversion system 1 comprises a recirculator that includes a recirculation column 18. The recirculation column 18 is arranged to receive third liquid from the separation tank 22. The recirculation column 18 is arranged to receive third liquid from a lower portion of the separation tank 22 via a pump inlet 26. The third liquid comprises second liquid and further finely divided material in suspension, such that the third liquid has a higher specific gravity than the second liquid. The recirculation column 18 is arranged to discharge fluid to mix with the first liquid from the riser conduit 21. More specifically, the recirculation column 18 discharges the third liquid to mix with first liquid at the first tank 16 and/or the second tank 16A, to thereby form the second liquid in the down-comer 19.

The recirculator further comprises a pump 17, to raise the third liquid in the recirculation column 18. The pump 17 may suitably comprise a fluid displacement force pump as described in more detail below with respect to FIGS. 1B and 1C, a propeller pump as described in more detail below with respect to FIG. 3, or other suitable slurry pump configurations.

In operation of the energy conversion system, the second liquid and third liquid being of higher specific gravity than the first liquid means that the height of first liquid in the riser conduit 20 is greater than the height of second liquid in the down-comer 19 and the third liquid in the recirculation column 18. The turbine 24 therefore converts potential energy of the first liquid into a work output as kinetic energy.

The recirculator recirculates the third liquid, maintaining the finely divided material in suspension. The recirculator receives the third liquid from a lower portion of the separation tank 22, where denser material moves as the fluids separate in the separation tank 22, through the pump inlet 26. The pump 17 draws the third liquid up the recirculation column 18, which is in fluid communication with the first tank 16 and the second tank 16A. The provision of pressurised fluid to the upper portion of the separation tank 22 serves to maintain a consistent base pressure in the separation tank 22, reducing demand on the pump 17. To further reduce demand on the pump 17, a rough vacuum can be applied above the fluid level in the first and second tanks 16, 16A. The amount of pressure applied to the separation tank 22 and the amount of vacuum applied to the first and second tanks 16, 16A can be chosen according to the flow parameters and overall dimensions of the energy conversion system, taking account of frictional losses occurring at the design operating flow rates and the head differences between the top and bottom parts of the energy conversion system. As will be appreciated, monitoring of the pressure/vacuum during operation can be performed using sensors (not shown) and suitable adjustments made to take account of any losses occurring in the system over time.

The supply of first liquid into the first and second tanks 16, 16A from the turbine 24 is regulated in order to maintain the height of liquid in each of the first and second tanks 16, 16A below a predetermined threshold. This helps to control the height of the first liquid in the riser conduit 21, thus maintaining the head of water available to drive the turbine 24.

The regulation of the supply of first liquid is performed by an alternating discharge arrangement that alternates the discharge from the turbine 24 between the first and second tanks 16, 16A. Alternating the discharge can be conveniently achieved by the diverter valve described in more detail below with respect to FIG. 4. During operation of the energy conversion system 1, fluid flows into one of the first and second tanks 16, 16A such that as one of the first and second tanks 16, 16A is filling with the first liquid, while the other is emptying. In this way it is possible to more readily control the mixing of the first fluid and the third fluid to produce a flow of second fluid in the down-comer 19 that has suitable density for continuing operation of the energy conversion system.

The separation tank 22 receives second liquid from the down-comer 19. The separation tank 22 separates the first liquid from the finely divided material, and discharges first liquid to the riser conduit 20 and third liquid to the recirculator column 18. The separation tank 22 has an area which decreases with decreasing height, so that velocity of flow within the tank falls with increasing height in the separation tank 22 to remove the finely divided material from suspension. This means separation occurs in the separation tank 22, with an upper portion of the separation tank 22 comprising the first liquid while a lower portion of the separation tank 22 comprises the third liquid. An outlet of the separation tank 22 located in the upper portion thereof discharges into the riser conduit 20 and a lower outlet of the separation tank 22 located in the lower portion thereof discharges into the recirculation column 18. The separation tank 22 comprises a drain valve 23 which can be used when initialising or shutting down the energy conversion system 1.

Figure 1A:
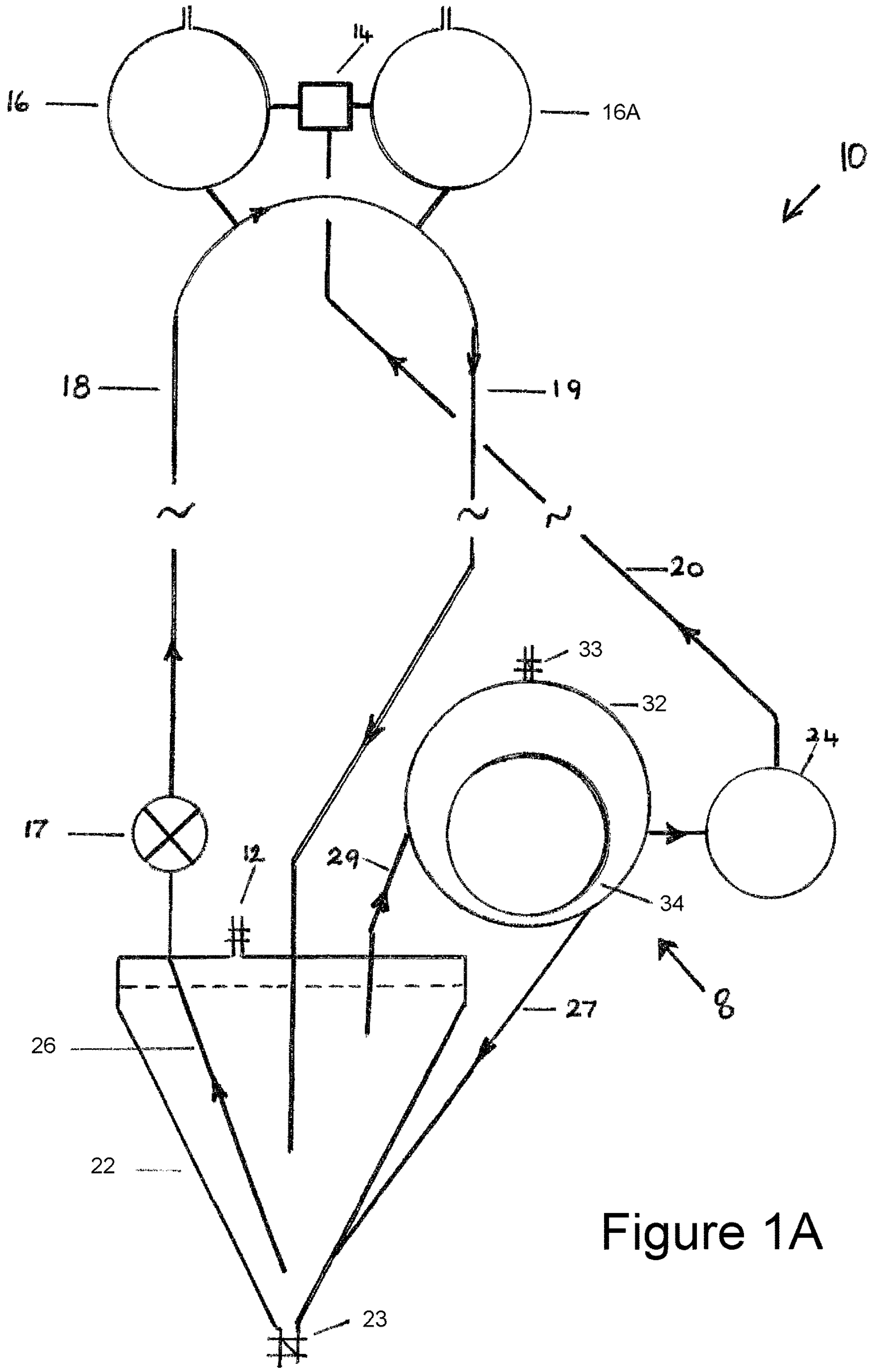
FIG. 1A is a schematic drawing of an energy conversion system, according to a second example embodiment.
Figure 2:
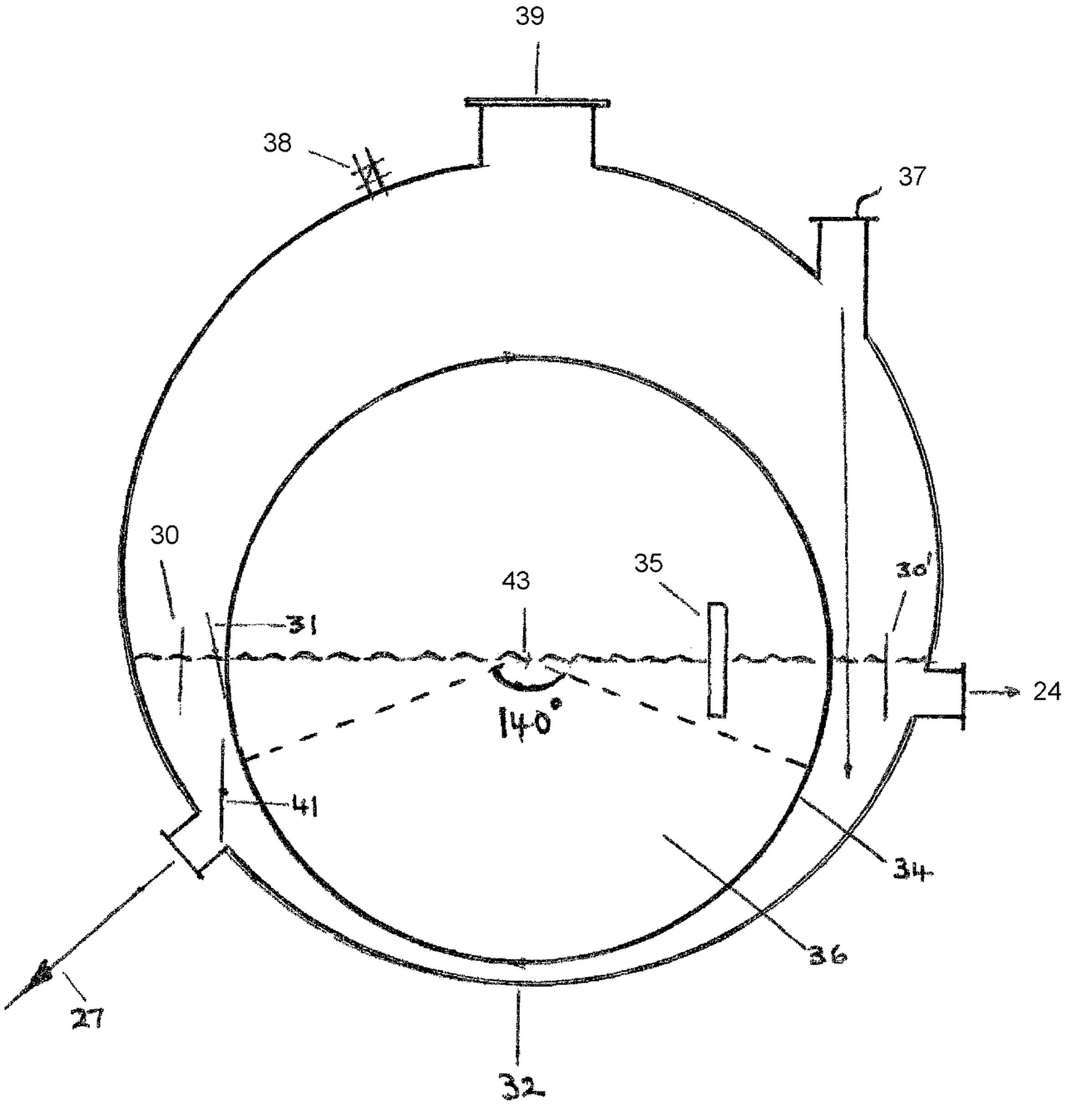
FIG. 2 is a sectional drawing of a separation vessel.

FIG. 1A is a schematic drawing of an energy conversion system 10, according to a second example embodiment. In FIG. 1A, the separation tank 22 serves as a manifold, with separation of the second liquid to produce the first liquid for the riser conduit 20 and the third liquid for the recirculator taking place in a separator 8. FIG. 2 and the associated description below give additional detail of the operation of the separator 8.

The separator 8 comprises a separation vessel 32, to remove finely divided material which remains in the fluid leaving the separation tank 22 via the separator infeed 29, which is arranged near the upper part of the separation tank 22. The separator 8 further comprises a turbine feed pipe which leads from the separation vessel 32 to the turbine 24, and a medium return pipe 27, which leads from the separation vessel 32 to the separation tank 22.

The separation vessel 32 receives fluid from the upper part of the separation tank 22 via the separator infeed 29. The separation vessel 32 operates to remove finely divided material from the fluid received via the separator infeed 29. The separation vessel 32 discharges first liquid to the riser conduit 20 via the turbine 24 and returns fluid which has a high concentration of finely divided material to the separation tank 22 via the medium return pipe 27.

Referring to FIG. 2, there is shown the separation vessel 32. The separation vessel 32 is cylindrical and is positioned so that its axis is horizontal. The separation vessel 32 comprises a separation drum 34, located within the separation vessel 32. The separation drum 32 is cylindrical and is positioned so that its axis is horizontal. The axis of the separation drum 34 is non-concentric with that of the separation vessel 32. The separation vessel 32 is sealed, with a pressure regulator 38 by which pressurised fluid can be added to or removed from the upper portion thereof. For example, compressed air, or a compressed inert gas such as nitrogen may be used. in order to maintain the level of the fluid in the separation vessel 32 around the level of the axis of the separation drum 32, which is above the level of the turbine feed pipe indicated in FIG. 2 with the arrow leading toward turbine reference numeral 24. Instead of pressurised gas such as air or nitrogen, a liquid which is generally immiscible with the third liquid may be used.

A fluid level indicator 35 is provided to aid determination of the correct fluid level after inspection through viewing port 39, facilitating any necessary regulation of the fluid level in the separation vessel 32.

The separation drum 34 is formed of a ferromagnetic material, and comprises a permanent magnet 36 located there-within. The permanent magnet 36 extends over approximately 140 degrees of the arc of the separation drum 34. The permanent magnet is arranged in fixed position, to act on the lower portion of the separation drum 34 irrespective of rotation of the separation drum 34.

The separation vessel 32 comprises an inlet 37 arranged to receive fluid from separator infeed 29. The separation vessel 32 comprises a wiper 31. The wiper 31 is biased into contact with the separation drum 34. The wiper 31 is adjacent to a barrier 30 positioned on the opposite side of the separation drum 34 to the inlet 37, biased to contact the separation drum 34.

The separation vessel 32 comprises a first drum outlet which is positioned below the point of contact between the wiper 31 and the separation drum 34, and which feeds into the medium return pipe 27. The barrier 30 cooperates with a servo-controlled splitter plate 41 to guide finely divided material toward the first drum outlet. The separation vessel 32 comprises a second drum outlet positioned on the opposing side of the wiper 31 and the barrier 30, but on the same side to the drum inlet 37. The second drum outlet comprises the turbine feed pipe, in fluid communication with the riser conduit 21. A second barrier 30A is provided between the separation drum 34 and the second drum outlet.

In use the fluid level 43 within the separation vessel 32 is lower than the level reached by the barriers 30, 30A. The fluid level 43 within the separation vessel 32 is such that half of the separation drum 34 is submerged.

The separation drum 34 rotates, in an anticlockwise direction in FIG. 2. The permanent magnet 36 does not rotate with the separation drum, and as such produces a magnetic region in which the finely divided material is attracted to the permanent magnet 36, located on an outer surface of the separation drum 34. The finely divided material moves with the separation drum 34, until the finely divided material leaves the magnetic region. At this point, finely divided material falls from the surface of the separation drum 34 under gravity. Because the edge of the magnetic region is located above the first drum outlet, the finely divided material falls into the first drum outlet. The barrier 30 aids in this process. First liquid that is located radially further out than the barriers 30, 30A leaves the separation vessel 32 through the second drum outlet under the action of the pressure within the separation vessel 22.

It will be appreciated that a small quantity of residual finely divided material may remain on the outer surface of the separation drum 34 even after the finely divided material has left the magnetic region. The wiper 31 removes such residual finely divided material from the surface of the separation drum 34. The residual finely divided material also falls into the first drum outlet. The discharge of finely divided material is further aided by positioning of the splitter plate 41, with suitable servo adjustment taking place during operation.

Alternative separation vessels, for example comprising alternative geometries and other features suitable to system design parameters for pressure, fluid throughput, footprint, fluid and finely divided material composition, separation efficacy etc. For example, the separation drum may be arranged with a vertical axis, with suitable modification to the position and arrangement of the magnet, inlet/outlets, wiper etc.

Figure 1B:
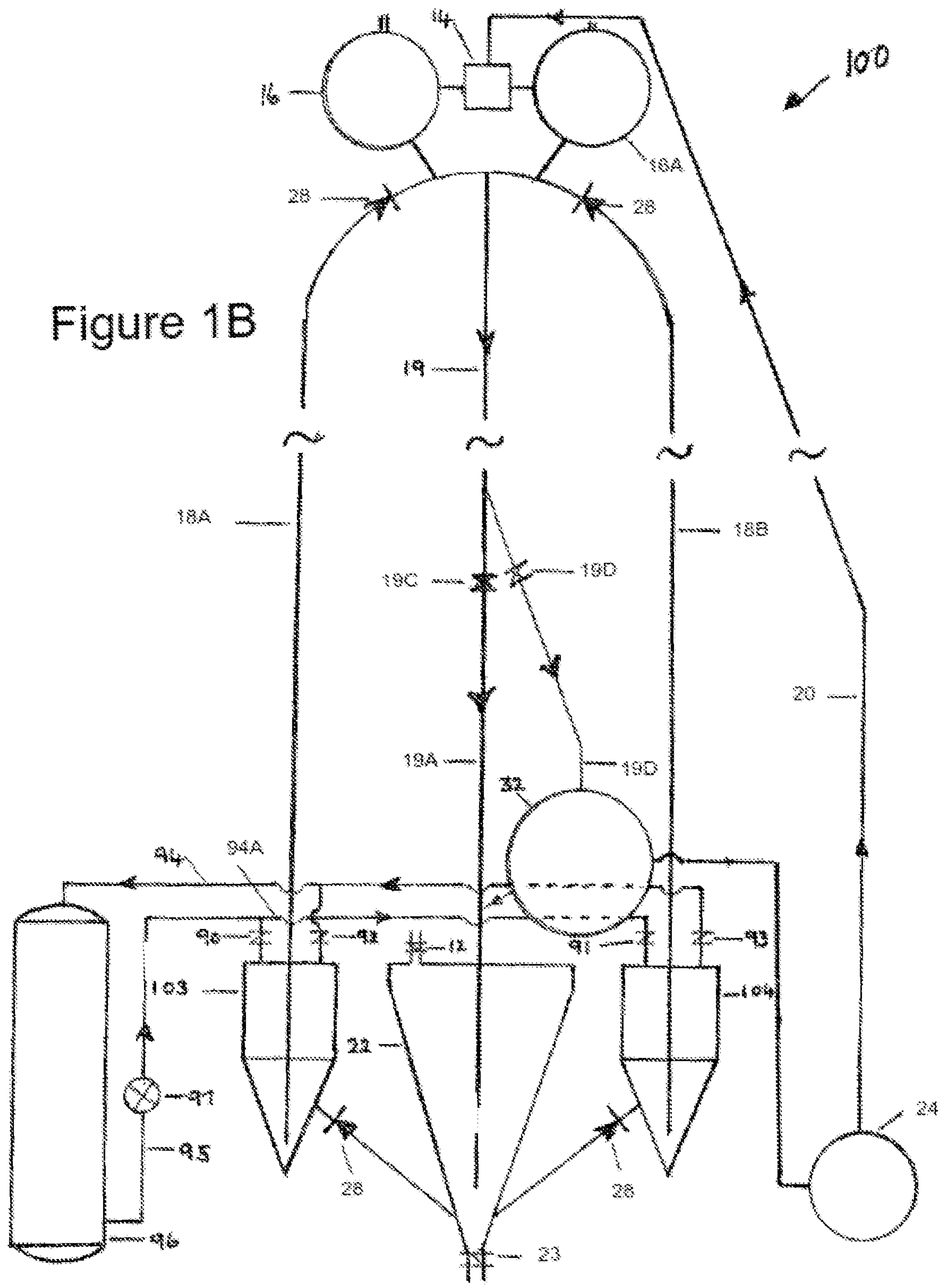
FIG. 1B is a schematic drawing of an energy conversion system, according to a third example embodiment.

FIG. 1B is a schematic drawing of an energy conversion system 100, according to a third example embodiment. In FIG. 1B, the separation vessel 32 is located in the downward path of second liquid in the down-comer 19. The down-comer 19 comprises a first leg 19A that feeds the separation tank 22, and a second leg 19B that fees the separation vessel 32. In this embodiment, separation all takes place in the separation vessel 32, with the separation tank serving purely as a manifold. Flow of second liquid in the first and second legs 19A, 19B of the down-comer 19 is regulated by valves 19C, 19D. In FIG. 1B the functionality of the pump 17 is provided by an air compressor 97, an air tank 95, first and second pump tanks 103, 104 and associated control valves 90, 91, 92, 93 and non-return valves 28. By appropriate opening and closing of the control valves 90, 91, 92, 93, a constant output of third liquid for the recirculator 18 is provided according to air pressure form the pump 97 accumulated in the air tank 95 and delivered through air pipes 94, 94A. That is, by applying pressure in an alternating manner to the airspace at the top of the first and second pump tanks 103, 104, according to opening and closing of the control valves 90, 91, 92, 93. The operating cycle of the direct air operated pump circuit will become apparent from the following description of the fluid displacement pump of FIG. 1C. As will be appreciated, in place of air, an inert gas such as nitrogen may be used.

Figure 1C:
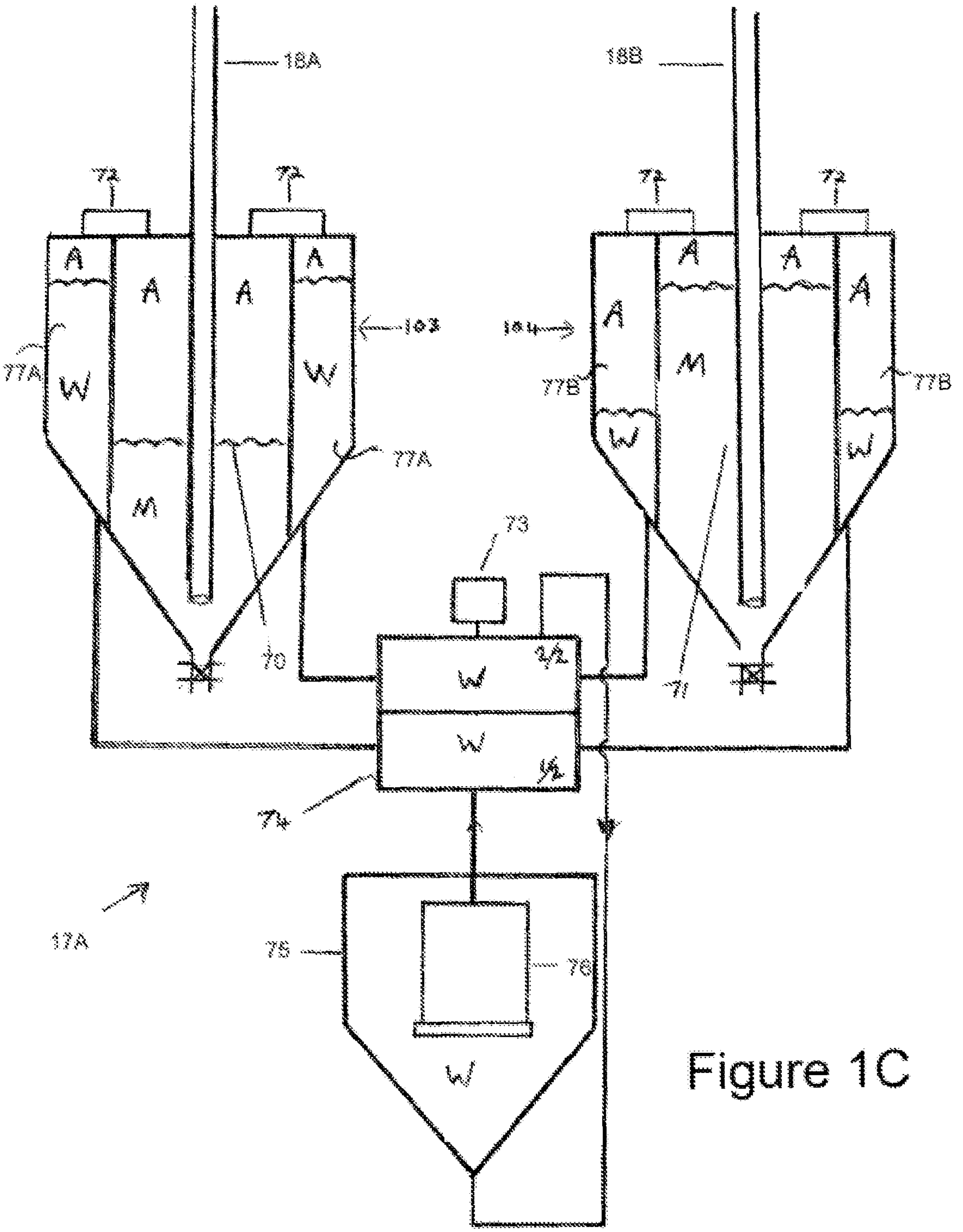
FIG. 1C is a schematic drawing of a fluid displacement force pump, as used in the energy conversion system of FIG. 1B.

Referring to FIG. 1C there is shown a fluid displacement force pump 17A used within the recirculator column 18 of an energy conversion system 10, in place of the propeller pump 17 of FIG. 1, or the direct air operated pump circuit of FIG. 1B. Some features of the fluid displacement force pump 17A are omitted from FIG. 1B for clarity. The fluid displacement force pump 17A operates in the manner described below, allowing the energy conversion systems 1, 10, 100 of FIG. 1, 1A or 1B to function in the same manner as that described with respect to FIG. 1 when using other types of pump to recirculate the third liquid.

The fluid displacement force pump 17A comprises a first pump tank 103 and a second pump tank 104. The first pump tank 103 comprises a first media chamber 70. The second pump tank 104 comprises a second media chamber 71.

The first media chamber 70 is in fluid communication with the separation tank 22 via the a first non-return valve 28. The first non-return valve 28 permits fluid flow into the first media chamber 70 from a lower part of the separation tank 22 but does not permit return from the first media chamber 70 in the opposite direction. The first media chamber 70 is in fluid communication with a first recirculator branch 18A, which extends upwardly from the first pump tank 103 as part of the recirculator column 18. The third liquid in the first media chamber 70 is labelled "M".

The second media chamber 71 is in fluid communication with the separation tank 22 via a second non-return valve 28. The second non-return valve 28 permits fluid flow into the second media chamber 71 but does not permit return from the second media chamber 71 in the opposite direction. The second media chamber 71 is in fluid communication with a second recirculator branch 18B, which extends upwardly from the second pump tank as part of the recirculator column 18. The third liquid in the second media chamber 71 is labelled "M".

The first pump tank 103 comprises a first saddle tank 77A. An upper part of the first saddle tank 77A is in fluid communication with the first media chamber 70 via connector tubes 72.

The second pump tank 104 comprises a second saddle tank 77B. An upper part of the second saddle tank 77B is in fluid communication with the second media chamber 71 via connector tubes 72.

The fluid displacement force pump 17A comprises a submersible pump 76, which is located within a pressure vessel 75. One side of the submersible pump 76 is in fluid communication with a first half of a diverter valve 74, and the other is in fluid communication with a second half of the diverter valve 74. In use, the submersible pump 76 operates to draw water from the second half of the diverter valve 74, and to pass water to the first half of the diverter valve 74. Water is labelled "W", in the first and second saddle tanks 77A, 77B and the first and second halves 1/2 and 2/2 of the diverter valve 74.

The first and second halves of the diverter valve 74 each comprise a port which is in fluid communication with the first saddle tank 77A. The first and second halves of the diverter valve 74 also each comprise a port which is in fluid communication with the second saddle tank 77B.

The saddle tanks 77A, 77B comprise water at their bottoms, with air above the water. The media tanks 70, 71 comprise third liquid at their bottoms, with air above the third liquid. The air is labelled "A". Air is also present in the connector tubes 72. As will be appreciated, in place of air, an inert gas such as nitrogen may be used. Indeed, instead of pressurised gas such as air or nitrogen, a liquid which is generally immiscible with the third liquid may be used.

No third liquid or water flows between the saddle tanks 77A, 77B and the media tanks 70, 71 at any point during operation of the force pump 17A, instead movement of water in and out of the saddle tanks 77A, 77B causes air pressure above the third liquid to force third liquid alternatingly out of the first and second recirculator branches 18A, 18B, and correspondingly pressure difference between the media tanks 70, 71 and the with the separation tank 22 draws third liquid into the opposite media tank 70, 71 as that from which third liquid is being delivered to the recirculator column 18. This pumping operation is controlled by changing the configuration of the diverter valve 74 using a drive 73.

In a first stage of the operation cycle of the fluid displacement pump 17A the diverter valve is in a first state. In the first state the second half of the diverter valve 74 is arranged such that water flows out of the second saddle tank 77B, into the second half of the diverter valve 74 and is then returned the suction side of the submersible pump 76 via the pressure vessel 75. The connection between the second side of the diverter valve 74 and the first saddle tank 77A is closed.

At the same time in the first stage of the operation cycle of the fluid displacement pump 17A, the first half of the diverter valve 74 receives water from the pressure vessel 75 via the pressure side of the submersible pump 76. The first half of the diverter valve 74 is closed to second saddle tank 77B, but open to the first saddle tank 77A such that the level of water in the first saddle tank 77A increases, pushing air into the first media tank 70, and thus displacing third liquid from the first media chamber 70 and up the first recirculator branch 18A. As shown in the configuration of FIG. 1B and described above, a non-return valve 28 between the first media chamber 70 and the separation tank 22 prevents flow of the third liquid directly back to the separation tank 22 as the fluid displacement pump 17A operates. Operation continues in this manner until the third liquid in the second media tank 71 reaches a maximum level, being drawn into the second media tank 71 from the separation tank 22 by the reduced pressure in the second media tank 71 as the space above the third media in the second media tank 71 is emptied of air through the connector tubes 72 as water in the second saddle tank 77B is pumped out. Again, as shown in the configuration of FIG. 1B, a non-return valve 28 is provided in the recirculator branch 18B so that the third liquid is drawn into the second media tank 71 from the separation tank 22 rather than back down the recirculator branch 18B.

In a second stage of the operation cycle of the fluid displacement pump 17A, the diverter valve 74 then switches to a second state under the control of the drive 73. In the second stage, the port in the first half of the diverter valve 74 that was closed in the first state opens, and the open port in the first half of the diverter valve 74 closes. Likewise, in the second stage, the port in the second half of the diverter valve that was open in the first state closes, and the closed port in the second half of the diverter valve 74 opens.

That is, in the second stage of the operation cycle of the fluid displacement pump, the second half of the diverter valve 74 is arranged such that water flows out of the first saddle tank 77A, into the second half of the diverter valve 74 and is then returned the suction side of the submersible pump 76 via the pressure vessel 75. The connection between the second side of the diverter valve 74 and the second saddle tank 77B is closed.

At the same time in the second stage of the operation cycle of the fluid displacement pump 17A, the first half of the diverter valve 74 receives water from the pressure vessel 75 via the pressure side of the submersible pump 76. The first half of the diverter valve 74 is closed to first saddle tank 77A, but open to the second saddle tank 77B such that the level of water in the second saddle tank 77B increases, pushing air into he second media tank 71, and thus displacing third liquid from the second media chamber 71 and up the second recirculator branch 18B. The non-return valve 28 between the second media chamber 71 and the separation tank 22 prevents flow of the third liquid directly back to the separation tank 22. This continues until the third liquid in the first media tank 70 reaches a maximum level, being drawn into the first media tank 70 from the separation tank 22 by the reduced pressure in the first media tank 70 as the space above the third media in the first media tank 70 is emptied of air through the connector tubes 72 as water in the first saddle tank 77A is pumped out. A non-return valve 28 is provided in the recirculator branch 18A so that the third liquid is drawn into the first media tank 70 from the separation tank 22 rather than back down the recirculator branch 18A.

As such, third liquid is constantly pumped from the separation tank 22 to the riser conduit 18, without the abrasive media of the third liquid encountering working parts of a pump, bearings, seals etc. This reduces pump wear and extends pump life.

Figure 3:
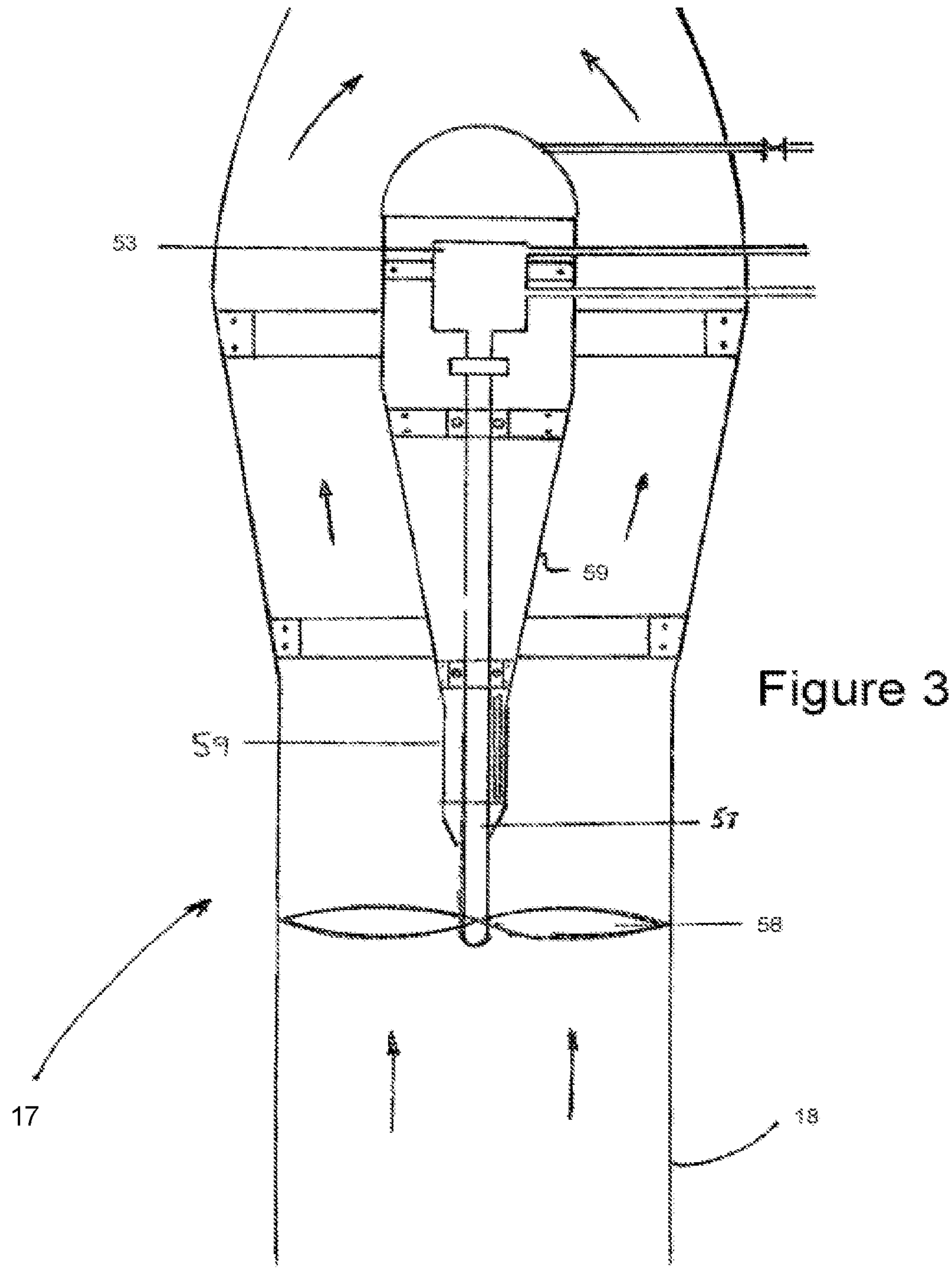
FIG. 3 is a sectional drawing of a propeller pump.

Referring to FIG. 3, there is shown a propeller pump 17. The propeller pump 17 is located within the recirculator column 18. The propeller pump comprises blades 58, which are connected to a shaft 57. The shaft 57 is directly coupled to a hydraulic motor 53.

The propeller pump 17 is lined with abrasion resistant material, such as a synthetic, semi-synthetic or natural rubber. A portion of the shaft 57 is located in an air-locked shroud 59. The hydraulic motor 53 is located in the air-locked shroud 59.

In use, the propeller pump 17 is driven by the hydraulic motor 53 to recirculate the third liquid. The abrasion resistant material protects the propeller pump 17 from damage from the finely divided material in suspension. The air-locked shroud 59 gives further protection to the portion of the shaft 57, the hydraulic motor 53, the seals (not shown) and the bearings (not shown) located there-within.

Figure 4:
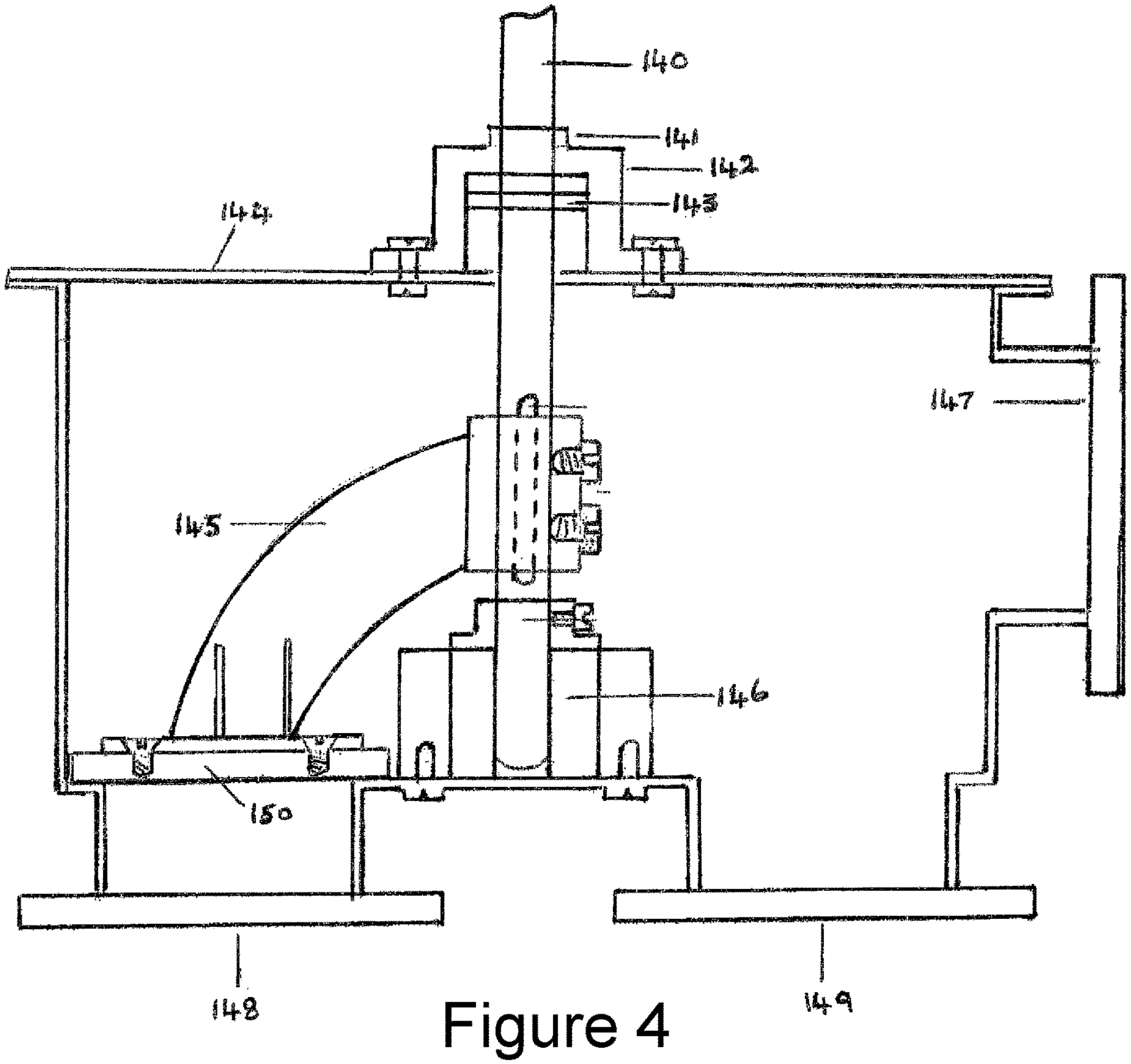
FIG. 4 is a sectional side view of a diverter valve.
Figure 4A:
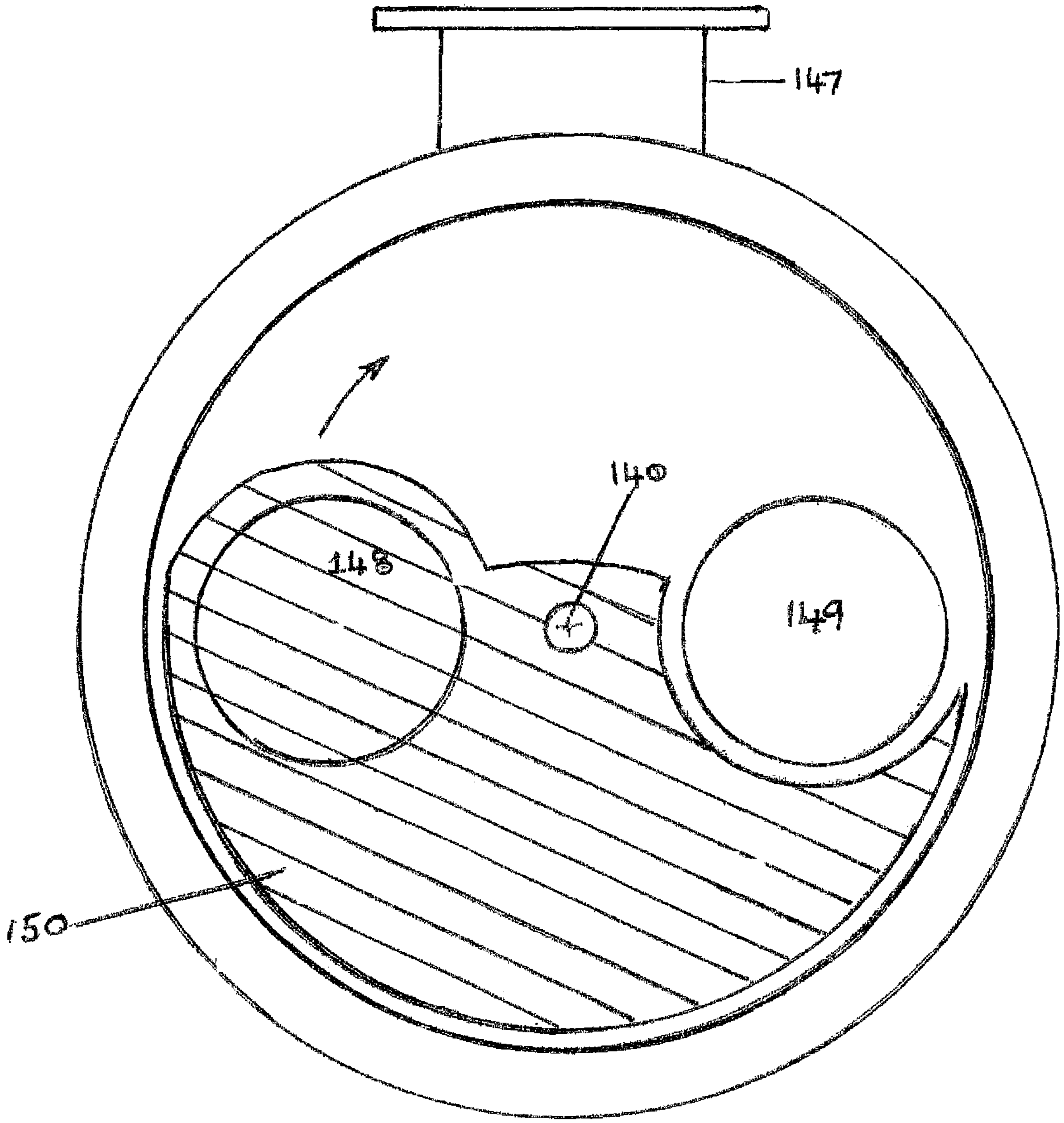
FIG. 4A is a plan view of the diverter valve of FIG. 4.

Referring to FIGS. 4 and 4A there is shown a diverter valve which may be used as the first and second halves of the diverter 74, and as the alternating discharge arrangement 14. The diverter valve comprises a shaft 140 which is connected to a motor (not shown), and a bearing housing 141 that supports bearings and seals 142 and 143 for the shaft. A bushing 146 cooperates with the bearing 142 to rotatably mount the shaft 140 to a chamber 144 of the diverter valve. The chamber 144 comprises a removable lid to facilitate access for inspection and maintenance. An arm 145 is attached to the shaft 140 to support a plate 150. The diverter valve further comprises an inlet port 147 and first and second outlet ports 148, 149.

In use, a motor continuously rotates the shaft, causing the plate 150 to rotate and alternately cover one of the two outlet ports 148, 149. This means that fluid which flows into the diverter valve through the inlet port 147 flows out of the outlet ports 148, 149, with a constant throughput as one outlet port is covered at the same rate as the other is uncovered by the rotation of the plate 150.

Figure 5:
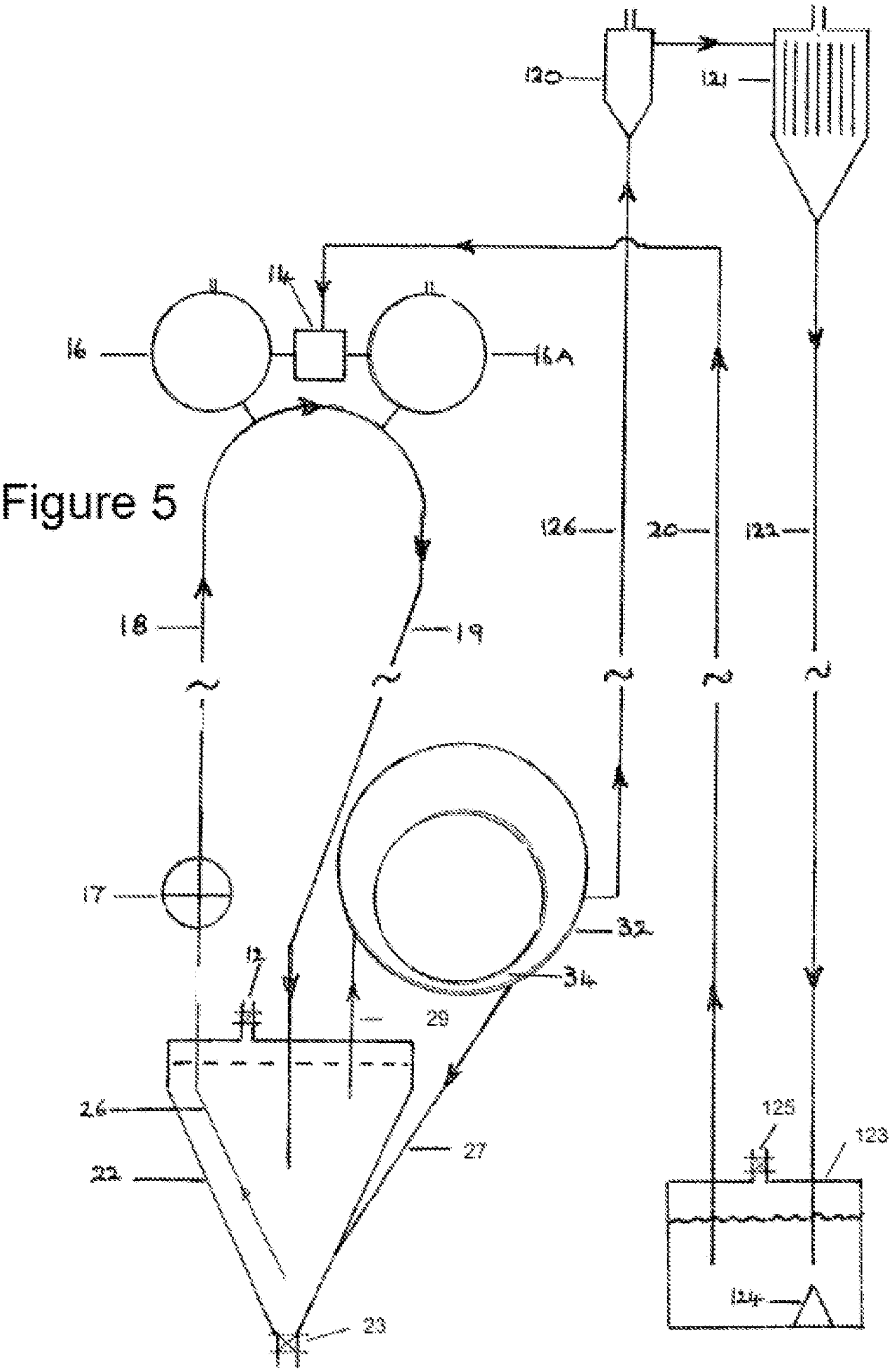
FIG. 5 is a schematic drawing of an energy conversion system, according to fourth example embodiment.

FIG. 5 is a schematic drawing of an energy conversion system 1000 according to fourth example embodiment. The energy conversion system 1000 comprises generally similar features to the energy conversion systems 1, 10, 100 of FIGS. 1, 1A and 1B, in particular that of FIG. 1A. However, in the energy conversion system 1000, the converter device converts energy of the first liquid into potential energy of compressed atmospheric air, rather than kinetic energy at a turbine. As will be appreciated, in place of air, any compressible gas may be used.

The energy conversion system 1000 comprises a hydraulic air compressor. The air compressor comprises a second riser 126, which connects to the separation tank 22 through a separation vessel 32. The second riser 130 extends upwardly to a header tank 120 which is in fluid communication with an air entrainment vessel 121. The air entrainment vessel 121 contains small diameter tubes.

The air compression system further comprises a down column 122, which leads from the air entrainment vessel 121 to a compressed air separator 123. The compressed air separator 123 connects to the riser 20.

In use, first liquid flows out of the separation vessel 32 up the second riser 130 and into the header tank 120. The first liquid flows from the header tank 120 to the air entrainment vessel 121. The small diameter tubes of the air compression vessel 121 cause atmospheric air to be entrained in the first liquid as the first liquid flows down the down column 122.

The first liquid with entrained air flows down the down column 122 and into the compressed air separator 123. The entrained air separates from the first liquid in the air separator 123 and is maintained under pressure due to the height of first liquid in the down column 122. On discharge from the down column 122 the first liquid impinges on a flow deflector 124, which deflects the flow, causing turbulence that aids separation of the entrained air from the first liquid. In the embodiment of FIG. 5 the flow deflector comprises a cone shaped projection on the base of the compressed air separator 123. Compressed air can be taken from the compressed air separator 123 at the valve 125, and its potential energy may be used in many applications.

The first liquid leaves the compressed air separator 123 via the riser 20, flowing back to the alternating discharge arrangement 14.

In this example energy conversion system, all of the work output may be delivered in the form of compression of air, and a turbine is not present. It will be appreciated that an air compression system of the type shown in FIG. 6 may be used in any of the described energy conversion systems instead of or alongside a turbine.

Figure 6:
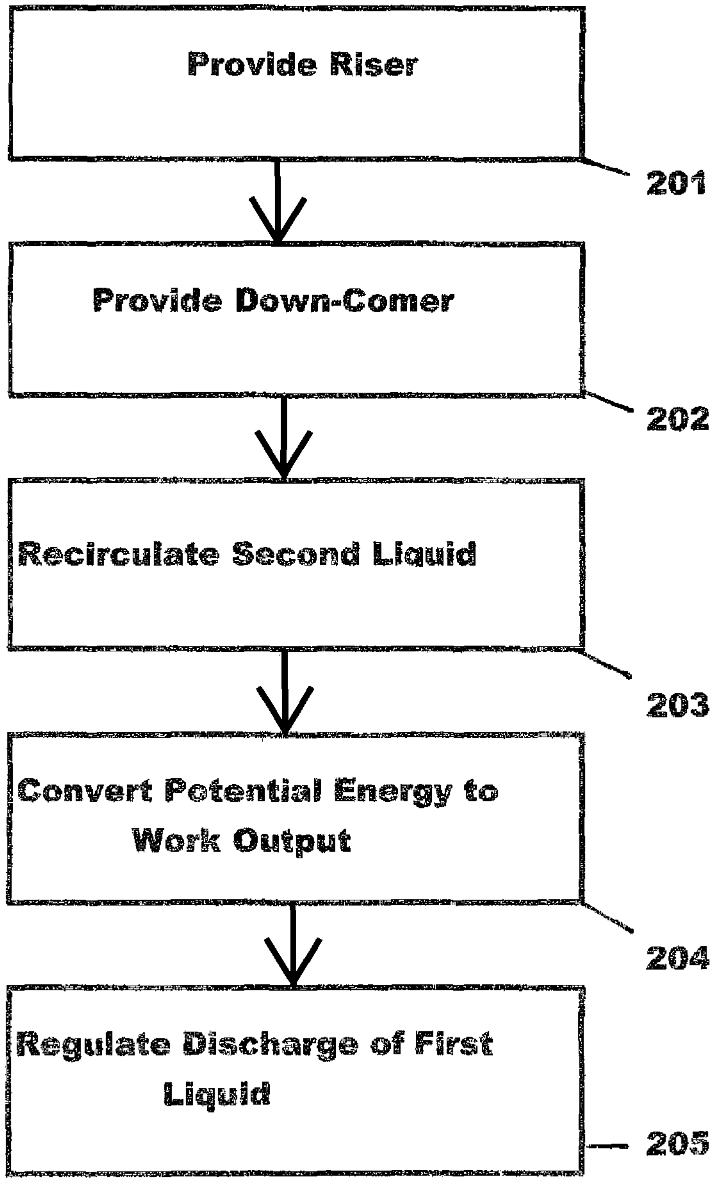
FIG. 6 is a flow diagram illustrating of a method of converting energy, such as may be performed through use of an energy conversion system as herein-described.

Referring to FIG. 6, there is shown a flow diagram of a method of converting energy. In a first step 201 of the method, a riser conduit comprising a first liquid is provided.

In a second step 202 of the method, a down-comer comprising a second liquid is provided. The down-comer is in fluid communication with the riser conduit, and the second liquid comprises first liquid and a finely divided material in suspension so that the second liquid has a higher specific gravity than the first liquid.

In a third step 203 of the method, third liquid is recirculated to maintain the finely divided material in suspension. The third liquid comprises second liquid and further finely divided material in suspension so that the third liquid has a higher specific gravity than the second liquid. The third liquid is mixed with the first liquid from the riser conduit to form second liquid in the down-comer.

In a fourth step 204 of the method, potential energy of the first liquid in the first column is converted into a work output.

In a fifth step 205 of the method, discharge of first liquid into first and second tanks is regulated, to maintain the height of liquid in each of the first and second tanks below a predetermined threshold so that mixing of the first liquid and third liquid takes place according to the discharge from the first and second tanks in order to produce the second liquid. Regulating the discharge of first liquid into the first and second tanks is performed by alternating discharge from the riser conduit 21.

It will be appreciated that the method described above could be employed using the energy conversion systems described above, and that some of the method steps 201-205 may be carried out in a different order from that shown in FIG. 7 or at the same time.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or before this specification in connection with this application and which are open to public inspection with this specification, and the contents of all such papers and documents are incorporated herein by reference.

All the features disclosed in this specification (including any accompanying claims, abstract and drawings), and/or all the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent, or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An energy conversion system comprising:

a riser conduit (20) comprising a first liquid;

a down-comer (19) comprising a second liquid, the down-comer (19) in fluid communication with the riser conduit (20), the second liquid comprising the first liquid and a finely divided material in suspension such that the second liquid has a higher specific gravity than the first liquid, the down-comer (19) in fluid communication with a first tank (16) and a second tank (16A);

a converter device (24) arranged to convert energy of the first liquid into energy for output from the energy conversion system, and to discharge the first liquid thereafter;

a recirculator (17, 18) in fluid communication with the down-comer (19) arranged to recirculate a third liquid to maintain the finely divided material in suspension, the third liquid comprising the second liquid and a further finely divided material in suspension so that the third liquid has a higher specific gravity than the second liquid, the recirculator (17, 18) arranged to discharge the third liquid to mix with the first liquid from the converter device (24) to form the second liquid; and a pressurizable separation tank (22) arranged to receive the second liquid from the down-comer (19), separate the first liquid from the finely divided material, and discharge the first liquid to the riser conduit (20) and the third liquid to the recirculator (17, 18), wherein the first tank (16) and the second tank (16A) are arranged between the converter device (24) and the down-comer (19), to receive the first liquid discharged from the converter (24) and to supply the first liquid to the down-comer (19), and wherein a height of liquid in the first and second tanks (16, 16A) is maintained below a predetermined threshold.

2. The energy conversion system of claim 1, wherein the regulation of the supply of the first liquid is performed by an alternating discharge arrangement (14) that in use alternates the discharge between the first and second tanks (16, 15).

3. The energy conversion system of claim 2, wherein the alternating discharge arrangement (14) comprises a diverter valve with a single inlet port and two outlet ports.

4. The energy conversion system of claim 3, wherein the diverter valve comprises a movable plate, arranged such that the movement of the plate such that the plate alternately covers one of two outlet ports to thereby provide alternating discharge.

5. The energy conversion system of claim 1, wherein the separation tank (22) has an area which decreases with decreasing height, so that velocity of flow within the separation tank (22) falls with increasing height in the tank to remove the finely divided material from suspension, and the separation tank (22) further comprises an upper outlet arranged to discharge into the riser conduit (20).

6. The energy conversion system of claim 5, wherein the separation tank (22) comprises a generally conical body.

7. The energy conversion system of claim 1, wherein the separation tank (22) further comprises a separation vessel (32), the separation vessel (32) arranged to receive the second or third liquid, separate the finely divided material from the received second or third liquid, and discharge the first liquid to the riser conduit (20) and return the second or third liquid to the separation tank (22) via a return pipe (27).

8. The energy conversion system of claim 7, wherein the separation vessel (32) comprises a rotatable separation drum (34) and a magnet (36), the magnet (36) arranged to attract the finely divided material so that the finely divided material attaches to the separation drum, which rotates to separate the finely divided material from the first liquid.

9. The energy conversion system of claim 8, wherein the magnet (36) is a permanent magnet located within the separation drum (34), the magnet (36) producing a magnetic region to attract the finely divided material so that the finely divided material attaches to the separation drum (34), wherein rotation of the separation drum causes the finely divided material located on the separation drum to leave the magnetic region and fall from the separation drum towards the return pipe (27).

10. The energy conversion system of claim 9, wherein the permanent magnet (36) extends over approximately 140 degrees of an arc of the separation drum (34).

11. The energy conversion system of claim 7, wherein the separation vessel (32) comprises a wiper (31) to remove the finely divided material from the separation drum (34) and direct the finely divided material towards the return pipe (27).

12. The energy conversion system of claim 7, wherein the separation vessel (32) is a pressure vessel, and a fluid level in the separation vessel (32) is controllable by controlling admission and venting of gas in the separation vessel (32).

13. The energy conversion system of claim 1, wherein the recirculator (17, 18) comprises a recirculation column (18) to receive the third liquid from the separation tank (22) and discharge the third liquid to mix with the first liquid from the first tank (16) and the second tank (15).

14. The energy conversion system of claim 13, wherein the recirculation column (18) is arranged to receive the third liquid from a lower outlet of the separation tank (22).

15. The energy conversion system of claim 1, wherein the recirculator (17, 18) comprises a propeller pump (17).

16. The energy conversion system of claim 15, wherein the propeller pump (17) is lined with an abrasion resistant material.

17. The energy conversion system of claim 15, wherein the propeller pump (17) comprises a shaft (57) protected by an air-locked shroud (59).

18. The energy conversion system of claim 15, wherein the recirculator (17, 18) comprises a hydraulic motor (53) arranged in use to drive the propeller pump (17).

19. The energy conversion system of claim 13, wherein the recirculator (17, 18) comprises a fluid displacement force pump (17A) operable to recirculate the third liquid.

20. The energy conversion system of claim 1, wherein the converter device (24) comprises a turbine (24) and the work output comprises kinetic energy.

21. The energy conversion system of claim 1, wherein the converter device (24) comprises a hydraulic air compressor, the hydraulic air compressor arranged in use to receive and compress air, so that the work output is compression of the air.

22. A method of converting energy, comprising the steps of:

providing a riser conduit comprising a first liquid (201);

providing a down-comer comprising a second liquid, the down-comer in fluid communication with the riser conduit (20), the second liquid comprising first liquid and a finely divided material in suspension so that the second liquid has a higher specific gravity than the first liquid, the down-corner in fluid communication with a first tank and a second tank (202);

separating, in a pressurized separation tank (22), the first liquid from the finely divided material;

discharging the separated first liquid to the riser conduit (20) and the third liquid to a recirculator (17, 18);

recirculating a third liquid comprising the second liquid and a further finely divided material in suspension to maintain the finely divided material in suspension, so that the third liquid has a higher specific gravity than the second liquid, and discharging the third liquid to mix with the first liquid from the converter device to form the second liquid (203);

converting potential energy of the first liquid in the first column into a work output and discharging the first liquid (204); and maintaining a height of liquid in each of the first and second tanks below a predetermined threshold (205).

* * * * *